US006708270B1

United States Patent
Mayer

(10) Patent No.: US 6,708,270 B1
(45) Date of Patent: Mar. 16, 2004

(54) PROGRAMMABLE UNIT HAVING ON CHIP DEBUGGING SUPPORT MODULE (OCDS) AND RESET MANAGER THAT DETERMINES IF OCDS SHOULD RESET IF PROGRAMMABLE UNIT IS RESET

(75) Inventor: Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/544,760

(22) Filed: Apr. 6, 2000

Related U.S. Application Data

(63) Continuation of application No. PCT/DE99/02411, filed on Aug. 2, 1999.

(30) Foreign Application Priority Data

Aug. 6, 1998 (DE) .......................... 198 35 610

(51) Int. Cl.[7] .......................... G06F 11/30; G06F 11/00; H04L 1/22; H04L 9/00
(52) U.S. Cl. .......................... 713/1; 713/2; 714/23; 714/30; 714/31; 714/40; 714/45; 714/46; 710/14; 710/16; 710/200
(58) Field of Search .......................... 710/14, 16, 100; 713/202, 203, 1.12; 714/30, 31, 46, 23, 40, 45

(56) References Cited

U.S. PATENT DOCUMENTS

| 5,491,793 A | * | 2/1996 | Somasundaram et al. ...... 714/45 |
| 5,544,311 A | * | 8/1996 | Harenberg et al. ............. 714/40 |
| 5,566,303 A | * | 10/1996 | Tashiro et al. ............... 710/100 |
| 5,644,579 A | * | 7/1997 | Sheppard .................... 714/726 |
| 5,758,059 A | * | 5/1998 | Alexander ................... 714/30 |
| 5,867,644 A | * | 2/1999 | Ranson et al. ................ 714/39 |
| 5,943,498 A | * | 8/1999 | Yano et al. .................. 717/128 |
| 5,978,937 A | * | 11/1999 | Miyamori et al. ............. 714/45 |
| 5,983,017 A | * | 11/1999 | Kemp et al. ................ 717/129 |
| 6,289,473 B1 | * | 9/2001 | Takase ........................ 714/35 |
| 6,311,292 B1 | * | 10/2001 | Choquette et al. ............ 714/30 |
| 6,487,466 B1 | | 11/2002 | Miyabe |

FOREIGN PATENT DOCUMENTS

| DE | 690 27 471 T2 | 10/1990 |
| DE | 296 21 868 U1 | 3/1997 |
| DE | 196 48 968 A1 | 12/1997 |
| DE | 197 47 082 C1 | 1/1999 |
| EP | 0 391 173 A2 | 10/1990 |
| EP | 0 416 732 A2 | 3/1991 |
| EP | 0 636 976 A1 | 2/1995 |
| EP | 0 720 092 A1 | 7/1996 |
| JP | 63046550 | * | 2/1988 |

OTHER PUBLICATIONS

Anonymous: "Pentium meets 1149.1 plus an async reset", *Electronic Engineering*, vol. 65, Aug. 1993, No. 800, p. 15.

* cited by examiner

*Primary Examiner*—Jeffrey Gaffin
*Assistant Examiner*—Tammara Peyton
(74) *Attorney, Agent, or Firm*—Laurence A. Greenberg; Werner H. Stemer; Gregory L. Mayback

(57) ABSTRACT

A programmable unit having an OCDS module and a method for using an external debugger to debug the programmable unit equipped with the OCDS module are described. The programmable unit is distinguished in that it has a reset management device by use of which it is possible to determine whether the OCDS module should or should not also be reset when the programmable unit is reset. Therefore, the debugging is not interfered with or interrupted by the programmable unit being reset before or during the debugging process.

9 Claims, 1 Drawing Sheet

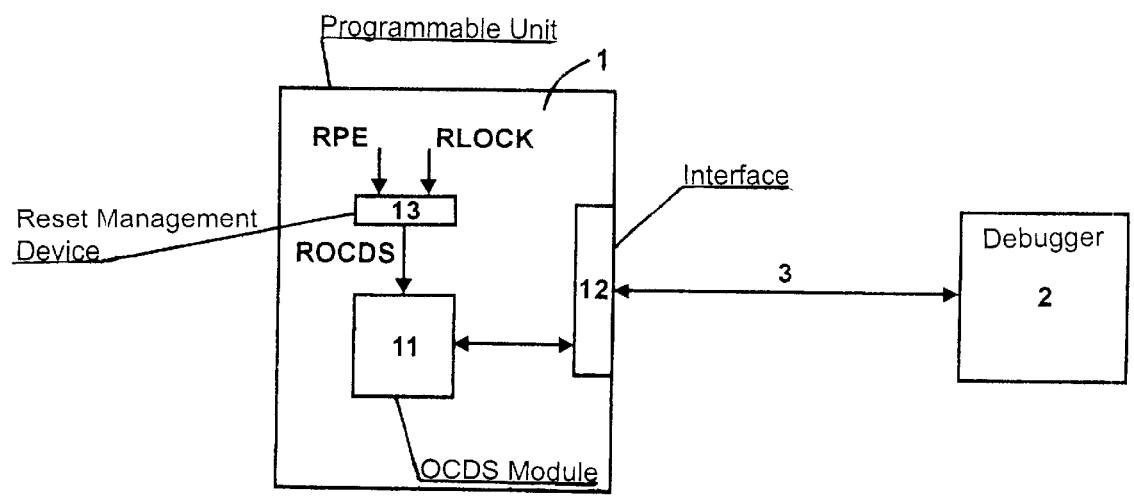

PROGRAMMABLE UNIT HAVING ON CHIP DEBUGGING SUPPORT MODULE (OCDS) AND RESET MANAGER THAT DETERMINES IF OCDS SHOULD RESET IF PROGRAMMABLE UNIT IS RESET

CROSS-REFERENCE TO RELATED APPLICATION

This is a continuation of copending International Application PCT/DE99/02411, filed Aug. 2, 1999, which designated the United States.

BACKGROUND OF THE INVENTION

FIELD OF THE INVENTION

The present invention relates to a programmable unit having an on-chip debugging support (OCDS) module, and to a method for using an external debugger to debug the programmable unit equipped with the OCDS module.

The programmable units in question are, for example, microprocessors, microcontrollers or the like; these have been known for many years in widely differing embodiments, and require no further explanation.

The OCDS modules are the so-called on-chip debugging support modules, which are now integrated in virtually all relatively modern programmable units. Such devices allow external debuggers to access programmable units and to influence them in various ways during the "normal" operation of the relevant programmable units. This is at present used primarily in such a way that the relevant programmable units are automatically stopped on reaching break conditions which can be predetermined, and/or in such a way that read and/or write accesses are carried out deliberately to the internal and external registers, memories and/or other components of the relevant programmable units and/or of the systems containing them.

The external debuggers are devices that have been known for a long time and in a wide range of embodiments for the purpose of searching for software and/or hardware faults that are present in the relevant programmable units or the systems containing them.

The OCDS modules make the external debuggers (whose configuration is relatively simple) very powerful tools, by which even programmable units whose configuration is very complex and/or which operate very fast can be monitored and checked efficiently and comprehensively.

However, this is unfortunately not always the case, in all situations. For example, it is problematic if the programmable unit is or must be reset immediately before or during a debugging process owing to internal and/or external events and/or commands. Debugging processes which have to be carried out or are currently being carried out can then be interfered with or interrupted, thus making it harder, or entirely impossible, to find specific faults in a comprehensible manner.

SUMMARY OF THE INVENTION

It is accordingly an object of the invention to provide a programmable unit, and a method for debugging such a unit which overcome the above-mentioned disadvantages of the prior art devices and methods of this general type, in which the debugging is not interfered with or interrupted by the programmable unit being reset before or during the debugging process.

With the foregoing and other objects in view there is provided, in accordance with the invention, a programmable unit configuration, containing a programmable unit having an on-chip debugging support (OCDS) module; and a reset management device connected to the OCDS module, the reset management device determining if the OCDS module should or should not also be reset when the programmable unit is reset.

The invention accordingly provides that the programmable unit has a reset management device by which it is possible to determine whether the OCDS module should or should not also be reset when the programmable unit is reset, and that when required after resetting of the programmable unit, the external debugger initiates resetting of the programmable unit without resetting the OCDS module.

If the resetting of the programmable unit, which may be required, is carried out before or during the debugging of the programmable unit, such that the OCDS module and, possibly, also an interface provided between the OCDS module and the external debugger is not reset in consequence, then the debugging of the programmable unit can be continued without being influenced in any way by the resetting of this unit.

Furthermore, the processes that take place after the resetting of the programmable unit can then also be monitored from the start, without any limitation and without any gaps.

It is extremely simple to provide the capability for the OCDS module to be reset only in certain situations with the programmable unit, rather than on all occasions. In the example under consideration, where the resetting of the programmable unit is not intended to interfere with or interrupt an existing or ongoing debugging process, all that has to be provided for this purpose is for the resetting of the OCDS module to be suppressed when and for as long as an external debugger is connected to the programmable unit and/or when and for as long as the external debugger which is connected to the programmable unit signals that the OCDS module should not be reset.

Other features which are considered as characteristic for the invention are set forth in the appended claims.

Although the invention is illustrated and described herein as embodied in a programmable unit, and a method for debugging such a unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a configuration for using an external debugger to debug a programmable unit according to the invention.

DESCRIPTION OF THE PREFERRED EMBODIMENT

Referring now to the single FIGURE of the drawing in detail, there is shown a programmable unit 1 to be debugged in the example under consideration is a microcontroller. However, it could just as well be any other programmable unit, such as a microprocessor.

An external debugger which debugs the programmable unit 1 is denoted by the reference symbol 2.

The programmable unit 1 contains, among other items, an on-chip debugging support (OCDS) module 11, a debugging interface 12, and a reset management device 13.

The programmable unit 1 and the debugger 2 are connected via a connection 3 that contains one or more cables.

The connection 3 opens at the programmable unit 1 and into the debugging interface 12, which is itself connected to the OCDS module 11. The debugger 2 is thus connected to the OCDS module 11 via the connecting cable 3 and the debugging interface 12.

The debugging interface 12 is, for example, a so-called JTAG interface. The JTAG interface and its use as a debugging interface are known, and require no further explanation.

The OCDS module 11 is a device that assists the debugger 2. This makes it possible for the debugger 2 to access and influence the programmable unit 1 in various ways during the "normal" operation of the programmable unit 1. In particular, this makes it possible to stop the programmable unit 1 automatically on reaching break conditions which can be predetermined, and/or to carry out read and/or write accesses deliberately to internal and external registers, memories and/or other components of the programmable unit 1, and/or of the system containing it.

The already mentioned reset management device 13 can - as the title itself already indicates - influence the resetting of the programmable unit 1.

The resetting of the programmable unit 1 can be initiated by internal and/or external events and/or by commands.

The reset management device 13 checks and determines whether all the components of the programmable unit 1 should be reset when the resetting of the programmable unit 1 is initiated in the normal way. In the example under consideration, the system checks and determines whether the OCDS module 11 should or should not also be reset when the programmable unit 1 is reset. In this case, the resetting of the OCDS module 11 is suppressed when and for as long as the debugger 2 is connected to the programmable unit 1, and/or when and for as long as the external debugger 2 which is connected to the programmable unit 1 signals that the OCDS module 11 should not be reset.

The decision as to whether the OCDS module 11 should also be reset when the programmable unit 1 is reset is signaled within the programmable unit 1 by an OCDS reset inhibit signal RLOCK, which is produced in the programmable unit 1 or is obtained from the external debugger 2.

The reset management device 13 is or contains a logic circuit, in the example under consideration, by which a signal RPE which initiates the resetting of the programmable unit 1 is linked to the OCDS reset inhibit signal RLOCK. The signal resulting from this is an OCDS reset signal ROCDS which initiates the resetting (or non-resetting) of the OCDS module 11.

In the simplest case, the reset management device 13 is a logic gate, by which the signal RPE which initiates the resetting of the programmable unit 1 and the OCDS reset inhibit signal RLOCK are linked such that the OCDS reset signal ROCDS resulting from this can initiate resetting of the OCDS module 11 only when there is no OCDS reset inhibit signal RLOCK signaling that the OCDS module 11 should not be reset.

In this way, it is reliably possible to ensure that the resetting of the programmable unit 1 that takes place immediately before a debugging process or during a debugging process cannot interfere with or interrupt the debugging process. The situation is exactly the opposite of this: since the OCDS module 11 is not automatically reset when the programmable unit 1 is reset, the external debugger 2 can now even follow and influence the behavior of the programmable unit 1 during and immediately after its resetting process. The programmable unit 1 components that are dedicated to the external debugger 2, that is to say, in particular, the OCDS module 11, can in fact remain completely uninfluenced by the resetting of the programmable unit 1.

It has even been found to be advantageous for the debugger 2 itself to initiate the resetting of the programmable unit 1, without the OCDS module 11 being reset, using a desirable configuration of the OCDS module 11. The behavior of the programmable unit 1 can then be followed and influenced without any limitation and without any gaps from a defined initial state.

Until now, this has not been possible since the resetting of the OCDS module 11 which took place together with the resetting of the programmable unit 1 meant that the OCDS module 11 had to be configured once again, by use of the debugger 2 which might be connected, before it could be used as desired. This of course takes some time and results in that the programmable unit 1 cannot be debugged for a corresponding length of time, or at most only to a limited extent.

All of the above statements relate to a check or definition as to whether the OCDS module 11 should or should not also be reset when the programmable unit 1 is reset. At the same time it is, of course, possible for the reset management device 13 to check and determine whether other components of the programmable unit 1 which are related to the debugging process should also not automatically be reset when the programmable unit 1 is reset. These other components include, in particular, the debugging interface 12 and, possibly further components whose resetting can interfere with or interrupt the debugging process.

Alternatively or additionally, any other components of the programmable unit 1 may also be dealt with as described, on the basis of the same or other conditions. Therefore, if required, it is also possible for the reset management device 13 or other devices to determine, for other components in the programmable unit 1, whether the relevant components should also be reset when the programmable unit 1 is reset.

The described apparatus and the described method thus result, in a surprisingly simple way, that the operation of devices connected to the programmable unit 1 may remain entirely uninfluenced by the resetting of the programmable unit 1.

I claim:

1. A programmable unit configuration, comprising:
    a programmable unit, including:
        an on-chip debugging support (OCDS) module; and
        a reset management device connected to said OCDS module, said reset management device determining if said OCDS module should or should not also be reset when said programmable unit is reset.

2. The programmable unit configuration according to claim 1, wherein said reset management device suppresses a resetting of said OCDS module when and for as long as an external debugger is connected to said programmable unit.

3. The programmable unit configuration according to claim 1, wherein said reset management device suppresses the resetting of said OCDS module when and for as long as an external debugger which is connected to said programmable unit signals that said OCDS module should not be reset.

4. The programmable unit configuration according to claim 1, wherein if said OCDS module should not be reset when said programmable unit is reset, said programmable unit generates an OCDS reset inhibit signal received by said reset management device for preventing the resetting of said OCDS module.

5. The programmable unit configuration according to claim 1, wherein if said OCDS module should not be reset when said programmable unit is reset, said programmable unit receives an OCDS reset inhibit signal from an external debugger for preventing the resetting of said OCDS module.

6. The programmable unit configuration according to claim 4, wherein said reset management device contains a logic circuit by which a signal which initiates a resetting of said programmable unit is logically linked to the OCDS reset inhibit signal, and said logic circuit outputting an OCDS reset signal received by said OCDS module for causing a resetting or non-resetting of said OCDS module.

7. The programmable unit configuration according to claim 5, wherein said reset management device contains a logic circuit by which a signal which initiates a resetting of said programmable unit is logically linked to the OCDS reset inhibit signal, and said logic circuit outputting an OCDS reset signal received by said OCDS module for causing a resetting or non-resetting of said OCDS module.

8. A method for using an external debugger to debug a programmable unit equipped with an OCDS module, which comprises:

initiating, via the external debugger, a resetting of the programmable unit without initiating a resetting the OCDS module.

9. A programmable unit configuration, comprising:

a programmable unit, including:

an on-chip debugging support (OCDS) module; and a reset management device connected to said OCDS module, said reset management device determining if said OCDS module should or should not also be reset when said programmable unit is reset, said reset management device suppressing the resetting of said OCDS module when and for as long as an external debugger connected to said programmable unit signals that said OCDS module should not be reset.

\* \* \* \* \*